United States Patent [19]

Hasley

[11] Patent Number: 4,747,723

[45] Date of Patent: May 31, 1988

[54] UNIVERSAL JOINT COUPLING

[76] Inventor: George E. Hasley, P.O. Box 2062, Hastings, Nebr. 68901

[21] Appl. No.: 11,883

[22] Filed: Feb. 6, 1987

[51] Int. Cl.⁴ .............................. F16B 2/02; F16B 7/04
[52] U.S. Cl. ..................................... 403/337; 403/310; 403/220; 403/373; 464/92
[58] Field of Search .............. 403/220, 335, 337, 338, 403/364, 344, 300, 305, 310, 311, 312, 313, 373; 464/92, 93

[56] References Cited

U.S. PATENT DOCUMENTS

| 406,287 | 7/1880 | Kehler | 403/344 |
|---|---|---|---|
| 416,575 | 12/1889 | Davey | 403/344 X |
| 918,078 | 4/1900 | McCaffrey | 403/344 |
| 961,987 | 6/1910 | Rust | 403/337 X |
| 1,195,250 | 8/1916 | Milbrath | 464/93 |
| 1,201,863 | 10/1916 | Orey | 403/344 |
| 1,656,935 | 1/1928 | Bahan | 403/344 X |
| 1,986,325 | 1/1935 | Dallwigk, Jr. | 403/364 X |
| 2,565,065 | 8/1951 | Chakeres | 403/337 X |
| 2,643,145 | 6/1953 | Sundbom et al. | 403/312 X |
| 2,679,148 | 5/1954 | Thrush | 464/93 |
| 2,753,702 | 7/1956 | Dunn | 464/93 |
| 2,773,365 | 12/1956 | Delf et al. | 403/220 X |
| 3,334,495 | 8/1967 | Jensen et al. | 403/337 X |
| 3,657,902 | 4/1972 | Cataldo | 464/92 |
| 4,411,449 | 10/1983 | Takada | 403/312 X |
| 4,469,014 | 9/1984 | Nelson | 403/337 X |
| 4,637,750 | 1/1987 | Ward | 403/344 |

FOREIGN PATENT DOCUMENTS

| 96935 | 4/1898 | Fed. Rep. of Germany | 403/373 |
|---|---|---|---|
| 2094 | of 1888 | United Kingdom | 403/337 |
| 2098908 | 12/1982 | United Kingdom | 464/92 |

OTHER PUBLICATIONS

IBM ® Technical Disclosure Bulletin, R. F. Gontarek, R. A. Rachui; Jun. 1981, p. 374, vol. 24, No. 1A.

Primary Examiner—Randolph A. Reese
Assistant Examiner—Peter M. Cuomo
Attorney, Agent, or Firm—E. Robert Newman

[57] ABSTRACT

A universal joint coupling including four identical cast parts, two of the four parts located on either side of disc of flexible material, each of the two parts conformed so as to fit together to form a shaft holding element having strength comparable to that of a single machined part.

6 Claims, 2 Drawing Sheets

UNIVERSAL JOINT COUPLING

FIELD OF THE INVENTION

The present invention relates generally to universal joints used as couplings and more particularly to a universal joint used to couple slow turning drive trains, flexible at the joint, which require a cushion start-stop.

BACKGROUND ART

An example of an application of the present invention is the coupling of the power shaft and the drive train of a center pivot irrigation system which drives the wheels of the towers. Couplings which affix on either side of a disc-shaped cushion of hard rubber or the like have been used in the past. Such couplings also employ attaching flanges which are bolted to either side of the disc at 90 degrees to each other. This is essentially the same assembled structure of the present invention, except known couples are machined out of steel and comprise a single steel piece on each side of the disc.

Such "single-piece" couplings of machine steel when used for center-pivots will in time rust together with the shaft members, causing replacement problems when the coupling fails. Also, in addition to the considerable machining required, the weight of the steel presents problems related to shipping and field replacement.

SUMMARY OF THE INVENTION

It is an object of the present invention to provide an improved universal joint coupling.

An additional object of the invention is the provision of a universal joint coupling which can be cast and which requires little machining to manufacture.

Another object of the present invention is to provide a universal joint coupling in which the time and tools required for replacement are minimal.

Still another object of the present invention is to provide a light weight coupling.

In general the object of this invention is to provide a universal joint coupling which employs shaft holding elements, on either side of a flexible disc, which are comprised each of two identical pieces which may be cast of aluminum and fit together in a fashion which provides comparable strength to that of a single piece of aluminum or other material were it possible to cast such an item.

BRIEF DESCRIPTION OF THE DRAWINGS

FIG. 3 is a partial interior elevational view of two castings placed alongside each other showing that in such juxtaposition they are identical; and FIG. 4 is a partial left and right side elevational view of two castings facing each other as they would when assembled.

DESCRIPTION OF THE BEST MODE

Figure 1:
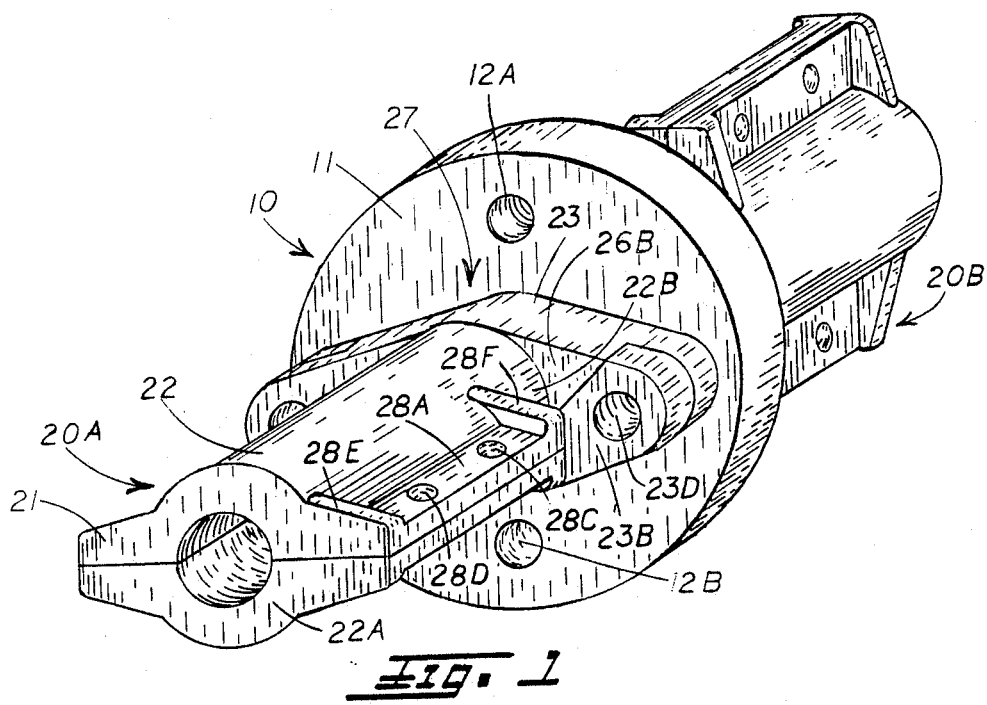
FIG. 1 is an isometric view of the universal joint coupling showing four of the identical castings assembled and affixed to a central flexible disc.

Referring now to the drawings wherein like reference numerals designate identical or corresponding parts throughout the several views, the universal joint coupling is shown assembled in FIG. 1 where it is designated generally at 10. Disc 11 is of hard rubber or the like and has four bolt holes 12a and 12b (the other two not being shown) positioned at 90 degrees around its perimeter. These four holes form pairs for bolting each of two base and collar assemblies, designated generally as 20a and 20b, to either side of disc 11 at 90 degrees to each other. Disc 11 transmits torque from one shaft to another while providing a cushion for sudden changes in velocity.

Figure 2:
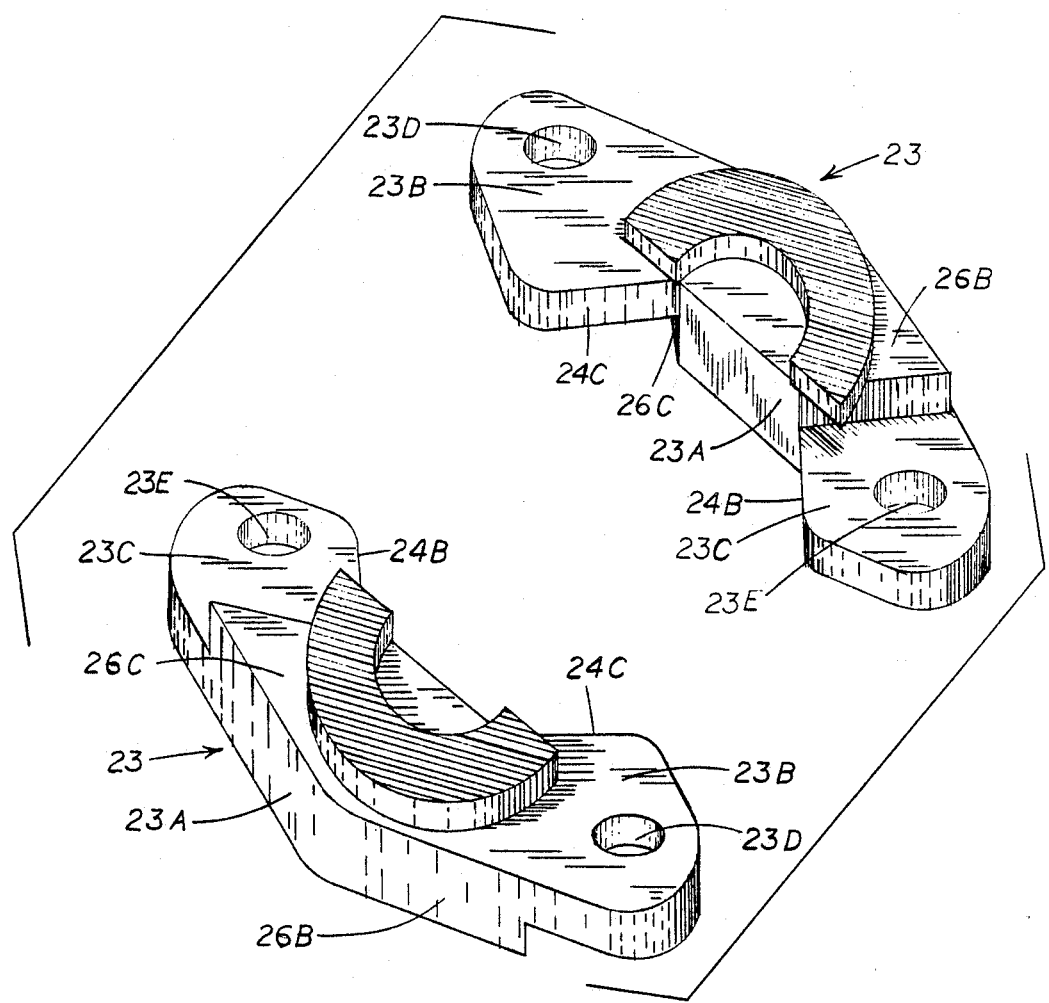
FIG. 2 is isometric partial sectional view of two of the identical castings as assembled with the section taken through line 2—2 of FIG. 4.

While cast as a single piece, each one-half section 21 of base and collar assembly 20a and 20b has a collar portion 22 and a base portion 23, affixed to each other. Four sections 21 are used in coupling 10 and are identical to each other. The cost of manufacture and inventory are thereby greatly reduced. Referring now to FIGS. 2 and 3, base portion 23 has a central body 23a, an upper wing member 23b on one of its sides, and a lower wing member 23c on the opposite side. Base and collar assembly 20a actually is comprised of two identical half-sections 21 which are divided in half by a longitudinal plane, and wing members 23b and 23c extend an equal distance on either side of that plane.

As best seen in FIG. 2, upper and lower wing elements 23b and 23c each have an interior side 24b and 24c, respectively, which angles at about 45 degrees to the longitudinal dividing plane and on opposite sides thereof. Complementing sides 24b and 24c, on opposite sides of the longitudinal dividing plan are stubs 26b (see FIG. 1) and 26c which also angle to the same degree and provided support against sides 24b and 24c for upper and lower wing elements 23b and 23c. Thus, when two base portions 23 are placed together by first facing them towards each other as shown in FIG. 4, upper wing member 23b of each base portion 23 fits above the lower wing member 23c of each base portion 23 to form a unitized solid base assembly, designated generally at 27 and seen in FIG. 1.

Collar portion 22 of base and collar assemblies 20a and 20b is comprised of a cylindrical body 22a which is closed at its connected end 22b and is comprised of two identical half-sections which are divided in half by the same longitudinal plane referred to hereinabove with respect to base portion 23. Although collar portion 22 is spoken of as a separate element, it is integral with base portion 23 and upper and lower wing elements 23b and 23c. All are cast as one item.

Also cast as part of the same items are tabs 28a and 28b on either side of each half-section of collar portion 22. Tabs 28a and 28b have a planar side which is adjacent to and does not encroach beyond the longitudinal plane referred to hereinabove. Upper gusset 28e (seen in FIG. 1 only) and lower gusset 28f resist stress caused by torque being transmitted by the turning shafts.

Two sections 21 (comprised of a cylindrical body 22a, tabs 28a and 28b, stubs 26b and 26c, upper wing element 23b, lower wing element 23c, and base portion 23) are placed together to form base and collar assembly 20a and two other sections 21 are placed together to form base and collar assembly 20b. Holes 23d and 23e in upper and lower wings 23b and 23c, respectively, provide for removable affixation of two sections 21 to each other and to disc 11 on either side thereof by means of nut and bolt combinations (not shown). Each hole 23e of a lower wing 23c and each hole 23d of an upper wing 23b will be aligned, their axes being within the longitudinal plane referred to hereinabove. The distance between these axe is equal to the distance between each of the pairs of holes 12a and 12b in disc 11. Thus bolt and nut combinations serve not only to complete each base and collar assembly 20a and 20b but also to removably affix them to disc 11.

Two holes 28c and 28d in tab 28a and two holes 28c and 28d in tab 28b are located equidistant from the axis of collar portion 22 and each a given distance from base portion 23. As a result the two holes 28c and 28d in tab 28a align with the two holes 28c and 28d in tab 28b when collar portion 22 is assembled. Bolt and nut assemblies (not shown) in paired holes 28c and 28d further strengthen base and collar assemblies 20a and 20b and are easily removed and assembled in the field.

There are various well known means for providing for solid gripping of shaft ends within the collar portions 22. One is by use of a bolt and nut combination which is placed within aligned holes through each half-section of collar portion 22 and the shaft. Others, such as threads, keys, and non-circular cross-sectioned shaft ends matching with non-circular interiors of collar portion 22 are well-known.

It will be readily understood that the particular disposition or arrangement or nature of the elements of the invention are not of the essence of the invention, and that many variations, substitutions, and modifications may be made, in departure from the particular construction and characterization in the drawings and foregoing description, without departing from the true spirit of the invention. It is therefore to be understood that the invention should be limited only by the breadth and scope of the appended claims.

What is claimed is:

1. A universal joint, comprising:
   means of flexible material for transmitting torque, having first and second planar opposing faces;
   a first base means of rigid material having a planar underside and a planar upper side, parallel to each other, wherein said first base means is comprised of two equal half sections which are divided by a first longitudinal plane, said first longitudinal plane being perpendicular to said planar underside, including:
   a lower wing means affixed to one side of each half-section of said first base means, said lower wing means having a planar underside coplanar with the underside of said half-section of said first base means and a planar upper side which is within a second imaginary plane which is perpendicular to said first longitudinal plane, said lower wings means extending on either side of said first longitudinal plane approximately the same distance;
   an upper wing means affixed to the side of each half-section of said first base means which is opposite said lower wing means, said upper wing means having a planar underside which is adjacent to said second imaginary plane extending on either side of said first longitudinal plane the same distance as said lower wing means extends; and
   means for removably affixing said upper wing means and said lower wing means of one said half-section of said first base means to the lower wing means and the upper wing means, respectively, of the other said half-section of said first base means;
   means for removably affixing said first base means to the first planar face of said torque transmitting means;
   means for removably affixing to said upper side of said first base means a free end of a first shaft, such that the axis of said first shaft lies in said first longitudinal plane and is centered between said upper and lower wings of each said half-section of said base means when said respective upper and lower wing means are affixed to each other;
   a second base means identical to said first base means;
   means for removably affixing said second base means to the second planar face of said torque transmitting means such that its pairs of upper and lower wings will be oriented at 90 degrees to those of said first base means; and
   means for removably affixing to the upper side of said second base means a free end of a second shaft, such that the axis of said second shaft extends coaxially with the axis of said first shaft.

2. The universal joint coupling as defined in claim 1, wherein said first and second shaft free end affixing means comprises:
   a first cylindrical collar having one end closed and a longitudinal axis, said closed end affixed to the upper side of said first base means and having its longitudinal axis lying in said first longitudinal plane:
   said first cylindrical collar being divided into two half-sections by said first longitudinal plane of said first base means;
   means for removably affixing the free end of said first shaft within said first cylindrical collar; and
   a second cylindrical collar identical to said first cylindrical collar affixed to the upper side of said second base means and having means for removably affixing the free end of said second shaft within said second cylindrical collar.

3. The universal joint coupling as defined in claim 2, wherein said removably affixing means of the free end of said first and second shafts within said first and second cylindrical collars include, respectively:
   a tab means affixed on either side of each half-section of said cylindrical collar, each said tab means having a planar face adjacent to said first longitudinal plane; and
   means for removably affixing said tab means of each half-section thereof to the tab means of the other half-section.

4. The universal joint coupling as defined in claim 3, wherein ecah of said half-sections of said first base means and first cylindrical collar including said tab means are comprised of a single aluminum casting and each of said half-section of said second base means and second cylindrical collar including said tab means are comprised of a single aluminum casting.

5. The univeral joint coupling as defined in claim 2, wherein each of said half-sections of said first base means and first cylindrical collars are comprised of a single aluminum casting and each of said half-sections of said second base means and second cylindrical collars are comprised of a single aluminum casting.

6. The universal joint coupling as defined in claim 1, wherein each of said half-sections of said base means are of cast aluminum.

* * * * *